United States Patent [19]

Raj et al.

[11] Patent Number: 4,865,334

[45] Date of Patent: Sep. 12, 1989

[54] LONG-LIFE MULTI-STAGE FERROFLUID SEALS INCORPORATING A FERROFLUID RESERVOIR

[75] Inventors: Kuldip Raj, Merrimack; James Bonvouloir, Nashua; Ronald Moskowitz, Hollis; Frank Bloom, Windham, all of N.H.

[73] Assignee: Ferrofluidics Corporation, Nashua, N.H.

[21] Appl. No.: 267,263

[22] Filed: Nov. 4, 1988

[51] Int. Cl.[4] .......................... F16J 15/40; F16J 15/54
[52] U.S. Cl. .......................................... 277/80; 277/59
[58] Field of Search .................. 277/1, 58, 59, 80, 135

[56] References Cited

U.S. PATENT DOCUMENTS

| | | | |
|---|---|---|---|
| 3,588,124 | 6/1971 | Guinard | 277/59 X |
| 3,773,336 | 11/1973 | Walter et al. | 277/58 X |
| 4,200,296 | 4/1980 | Stahl et al. | 277/80 |
| 4,502,700 | 3/1985 | Gowda et al. | 277/80 |
| 4,526,379 | 7/1985 | Raj | 277/80 |

*Primary Examiner*—Robert S. Ward
*Attorney, Agent, or Firm*—Wolf, Greensfield & Sacks

[57] ABSTRACT

A multi-stage ferrofluid seal incorporates a ferrofluid reservoir for extending seal life. The reservoir is located between seal stages and contains a quantity of ferrofluid sufficient to replace ferrofluid in the seal stages which is lost due to evaporation or contamination. The seal is designed to withstand a pressure drop between a high pressure area and a low pressure area and the location of the reservoir is selected so that the pressure capacity of the seal stages between the low pressure area and the reservoir is sufficient to withstand the entire pressure drop. The pressure capacity of the seal stages between the high pressure area and the reservoir is less than the entire pressure drop. Failure of the seal stages between the reservoir and low pressure area causes failure of the seal stages between the reservoir and the high pressure area. The total failure of all of the seal stages allows fluid to flow through the seal which fluid sweeps ferrofluid from the reservoir into the seal stages between the reservoir and low pressure area. This latter ferrofluid replenishes the ferrofluid in the failed seal stages and restores pressure capacity of the seal. A preferred embodiment is described which utilizes a single pole piece to define the seal stages and the reservoir.

19 Claims, 2 Drawing Sheets

LONG-LIFE MULTI-STAGE FERROFLUID SEALS INCORPORATING A FERROFLUID RESERVOIR

FIELD OF INVENTION

The present invention relates generally to ferrofluid seals, and, more particularly, to long-life multi-stage ferrofluid seals which have resistance to failure due to ferrofluid starvation within seal stages over extended periods of seal use.

SUMMARY OF THE PRIOR ART

Ferrofluid seals are generally well known in the art. Examples of some such devices are shown in the following United States Patents whose disclosures are incorporated herein by reference as indicative of the present state of the art in this field. These patents are U.S. Pat. Nos. 3,620,584; 4,526,382; 4,526,380; 4,527,805; 4,380,356; and Japanese Patents Nos. 58-104804 and 58-230631, and Russian Patent documents nos. SU-653-470; SU-104821A; SU-655-858; SU-781-469 and 742-657 are similarly relevant to the present invention as indicative of the present level of the skill in the art.

Generally, a ferrofluid seal for a rotating shaft comprises an annular magnet and one or more pole pieces. The magnet and pole piece arrangement is mounted in a housing through which the shaft passes. A pole piece extends radially from the magnet towards the shaft and terminates in an inner concentric surface located close to, but not touching, the surface of the shaft. A gap is thus created between the pole piece and the surface of the shaft. Another pole piece, bearing or housing in magnetic contact with the magnet extends toward the shaft to complete the magnetic circuit. In order to complete the seal, ferrofluid is injected into the gap between the first pole piece and the shaft and is retained therein by the magnetic flux generated by the magnet which passes through the pole piece and ferrofluid in the gap. A fluid O-ring seal is effectively created between the pole piece and the surface of the shaft.

Numerous prior art designs and modifications have been developed which utilize the above-discussed structure, all with their own particular benefits. Although these prior art designs have generally been able to meet requirements of particular applications, seal life has remained a problem. More particularly, during seal operation, the ferrofluid within the seal gap or gaps tends to be lost for various reasons. These reasons include direct loss by evaporation. In addition, exposure to aggressive gases in the seal environment often leads to degradation of the ferrofluid. The degraded ferrofluid is then lost from the seal gap by splashing and the seal fails and begins to leak, requiring replacement of the ferrofluid.

Since ferrofluid seals are manufactured to close tolerances which are necessary for proper operation, it is often difficult to replace the ferrofluid without damaging the mechanical portions of the seal and thus requiring replacement of the entire seal. Further, since seals of this type are often mounted in relatively inaccessible places, they are not easily removed and replaced without disassembling the entire structure in which the seal is located. This disassembly often requires trained technicians and is a time-consuming and costly job.

One prior art method of increasing seal life has been to increase the amount of ferrofluid retained in the gap by increasing the gap width. Although increasing gap width allows more ferrofluid to be inserted into the gap, the increased gap width decreases pressure capacity (the difference in pressure between one side of the fluid O-ring and the other that the seal can withstand without leakage) so that for many applications, the pressure capacity of long life seals is insufficient. Consequently, the art searched for a means of increasing the pressure capacity of long-life ferrofluid seals. It was understood that the pressure capacity of a single seal was influenced by the intensity of the magnetic flux which retained the ferrofluid within the gap. Consequently, many prior art designs utilized specially-shaped pole pieces or magnets to increase the magnetic flux in the gap thereby increasing the pressure capacity.

Even with the above modifications, some applications require higher pressure capacities than could be attained by increasing the magnetic flux in the seal gap. However, it was also realized that the overall pressure capacity of a sealing system comprised of many single seals arranged in "series" was equal to the sum of the individual pressure capacities of the seals which made up each "stage" of the system. Consequently, multi-stage seals were developed which exhibited far greater pressure capacity than single seals. Multi-stage seals were generally created by forming separate ferrofluid O-rings within the seal area. The separate O-rings were, in turn, created by structures consisting of grooves or teeth on the pole pieces, of rings on the surface of the shaft or of a combination of the two constructions. These structures produced a series of annular gaps with narrowed width with respect to adjacent areas and the relatively more intense magnetic flux in these annular gaps created the separate ferrofluid O-ring seals desired resulting in an overall seal with relatively high pressure capacity.

However, such seals are generally large and bulky due to the plurality of seals located in series. In order to reduce the overall size of the seal, the individual seal gaps were made as small as possible. Consequently, compact multi-stage seals generally have limited life because of the low amount of ferrofluid in each seal gap. In the case of many multi-stage seal designs, seal life problems are further exacerbated by the fact that overall seal life may depend on the life of only a few of the seal stages. More particularly, when the ferrofluid in one or more seal gaps is lost, the corresponding seals fail and transfer the entire pressure drop across the remaining seals. If the remaining seals are not able to support the entire pressure drop, the entire seal fails.

Accordingly, it is an object of the present invention to provide a multi-stage ferrofluid seal having a useful seal life which is relatively long when compared to presently available ferrofluid seals.

It is also an object of the present invention to provide a long-life multi-stage ferrofluid seal which can be incorporated into a multi-stage seal design that is capable of withstanding high-differential pressures with a relatively small sealing width.

It is a further object of the present invention to provide a multi-stage ferrofluid seal which is characterized by simple assembly and disassembly.

It is still further an object of the present invention to provide a ferrofluid seal wherein fewer component requiring the maintenance of critical tolerances during the manufacturing operation are required than in prior art seals.

It is yet another object of the present invention to provide a ferrofluid seal wherein the overall number of components is reduced in comparison with presently-available ferrofluid seals.

Still another object of the present invention is to provide a ferrofluid seal which exhibits an inherently low magnetic flux leakage, thereby reducing the need for magnetic shielding, while at the same time being protected from external sources of magnetic flux.

SUMMARY OF THE INVENTION

These objects are attained, and other features and advantages of the present invention are provided, by a ferrofluid seal wherein a ferrofluid reservoir is disposed at a preselected location within the seal. In the case of a multi-stage seal a plurality of reservoirs may be provided between the stages of the seal. The reservoir is constructed so that, as the ferrofluid within a sealing gap starts to degrade and the stage starts to leak, ferrofluid from the reservoir is swept into the gap. The lost or degraded ferrofluid is thus rejuvenated and the pressure capacity and performance of the seal is restored.

In one illustrative embodiment of the invention, a multi-stage ferrofluid seal is adapted to provide a seal between a substantial vacuum on one side and atmospheric pressure on the other side. In this embodiment, the seal stages are formed by a plurality of teeth located on one of the pole pieces or on the corresponding section of the shaft. At a preselected location between the seal stages, the pole piece has a cavity which is filled with ferrofluid. In this manner, a reservoir is created within the multistage seal structure.

The location of the reservoir is chosen so that the number of seal stages between the reservoir and a first end of the seal is at least sufficient to withstand the entire pressure drop to which the overall seal is subjected. At least one seal stage is provided between the reservoir and the second end of the seal. This latter seal stage functions primarily to retain the ferrofluid in the reservoir.

With such a seal construction, ferrofluid loss or degradation which occurs in normal use will be effectively limited to the seal stages between the reservoir and the first seal end. When the seal stages begin to leak in this area, the entire pressure drop is placed across the seal stages located between the reservoir and the second seal end, causing these seal stages to break down. Consequently, there will be a fluid flow caused by rushing gas from the second seal end toward the first seal end.

Due to the reservoir cavity, the magnetic flux density holding the ferrofluid within the reservoir is substantially less than the flux density in the seal gaps and thus the fluid flow through the seal tends to sweep the ferrofluid out of the reservoir toward the first seal end. As ferrofluid movement occurs, the fluid from the reservoir refurbishes the stages between the reservoir and first seal end with fresh ferrofluid and restores the overall pressure capacity of the seal. Thus, movement of ferrofluid within the seal gaps is automatic in accordance with the fluid flow through the seal and occurs only when additional fluid is required by the seal stages.

The quantities of ferrofluid required by each seal stage in comparison to the quantity of ferrofluid in the reservoir are such that the automatic ferrofluid transfer and rejuvenation of the seal stages may occur several times during the useful life of the seal, so that the inventive seal life is substantially longer than the life of similar prior art seals.

BRIEF DESCRIPTION OF THE DRAWINGS

The present invention will be best understood by reference to the following detailed description of two preferred embodiments thereof and by reference to the attached drawings in which.

DETAILED DESCRIPTION OF THE PREFERRED EMBODIMENTS

Figure 1:
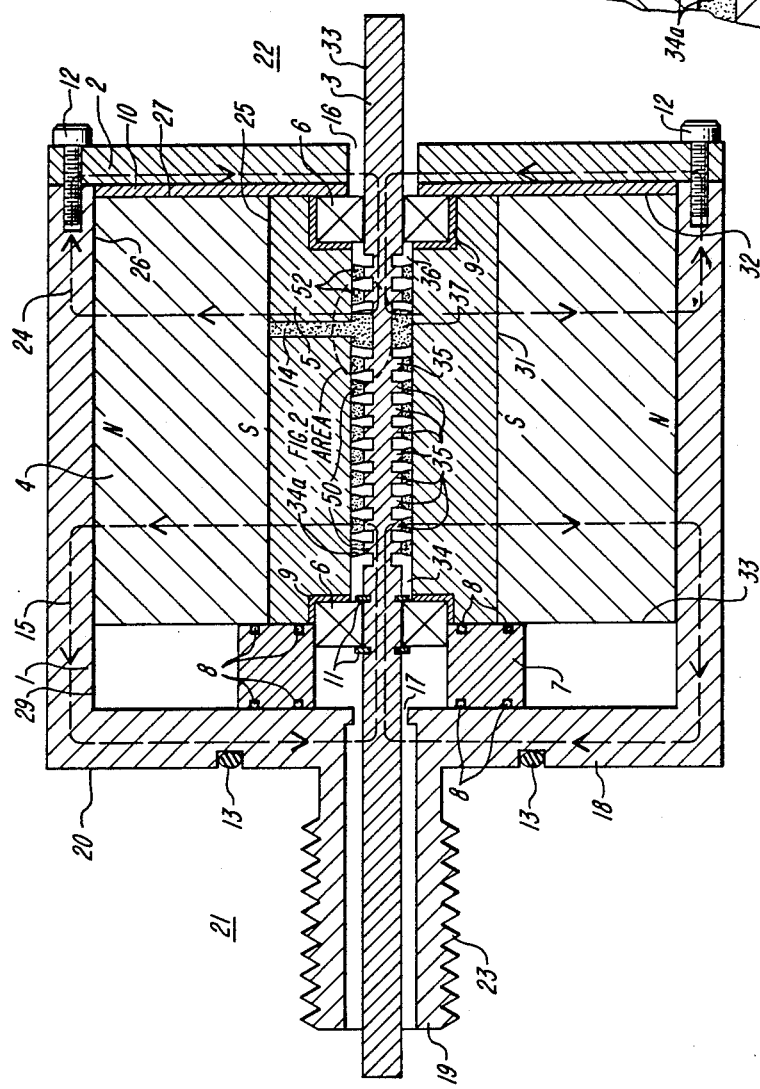
FIG. 1 is a schematic cross-sectional view of a multistage ferrofluid seal constructed in accordance with the present invention.

Referring now to the drawings, and particularly to FIG. 1, a multi-stage ferrofluid seal generally comprises a magnetically-permeable, hollow housing 1 having a detachable cover 2 secured to the housing by a plurality of bolts 12. Housing 1 has a threaded portion 19 which can be screwed into the structure on which the seal is to be mounted. When the seal in tightened into position, an elastomer O-ring 13 fitted into an annular notch cut into side 20 of housing wall 18 seats against a facing plate (not shown) on the structure to form a mechanical seal between the seal unit and the corresponding structure. In one illustrative application of this embodiment, housing and its associated seal are designed to form a seal between an area of low pressure (such as a vacuum) 21 and area of substantially higher pressure (such as atmospheric pressure) 22.

A magnetically-permeable, rotating shaft 3 extends through openings 16 and 17 which are centrally located in the cover 2 and bottom wall 18 of the housing 1. Shaft 3 also extends through portion 19. Within housing 1, shaft 3 is sealed by a plurality of ferrofluid O-ring seals formed as described below.

More particularly, within housing 1, the ferrofluid seal comprises an annular radially-polarized magnet 4, pole piece 5 and ferrofluid 50. Magnet 4 has an outer concentric surface 26 which is attached to the inner surface 29 of housing 1 in order to prevent passage of fluid, for example by press-fitting or by cementing. A disk of non-magnetically permeable material 10 separates magnet 4 from cover 2, and an annular. non-magnetically-permeable spacer 7 separates magnet 4 from bottom wall 18 of housing 1. O-rings 8 seal the adjoining surfaces of spacer 7 with wall 18 of housing 1, magnet 4 and the pole piece 5.

Magnet 4 also has an inner concentric surface 25 which is attached o annular pole piece 5 which has substantially the same length as magnet 4. The inner concentric surface 30 of pole piece 5 is disposed close to, but not touching, the surface 33 of the shaft 3 so as to create a gap 34 therebetween. The inner concentric surface 30 of pole piece 5, and/or the surface 33 of shaft 3 have a first series of opposing rings or teeth 35 on the vacuum side 21 to define a plurality of seal gaps 34a. A second series of teeth 36 define several seal gaps adjacent the atmospheric side 22.

Ferrofluid in gaps 34a create two series, generally indicated at 50 and 52, of ferrofluid seals between pole piece 5 and shaft 3. As described below, a ferrofluid reservoir 37 is located between the two series 50 and 52 of seal stages. The number of such O-rings or stages created in series 50 is selected, in accordance with the invention, to at least support the entire pressure drop between the vacuum side 21 and the atmospheric side 22 of the seal, and preferably includes a safety margin as well. The second series of seal stages 52 need only comprise a few stages, for example, 2 to 4 stages in order to hold the ferrofluid in reservoir 37 in place.

In accordance with the invention, the ferrofluid reservoir which automatically replenishes the seal stages is an annular cavity 37 created about the surface of shaft 3 by the absence of several teeth on pole piece 5. Preferably the axial width of this reservoir along the shaft is three to four times the distance between the teeth which form the seal gaps. A sealable passage 14 extends through pole piece 5 and communicates with cavity 37 allowing cavity 37 to be filled with ferrofluid subsequent to the assembly of the seal.

Figure 2:
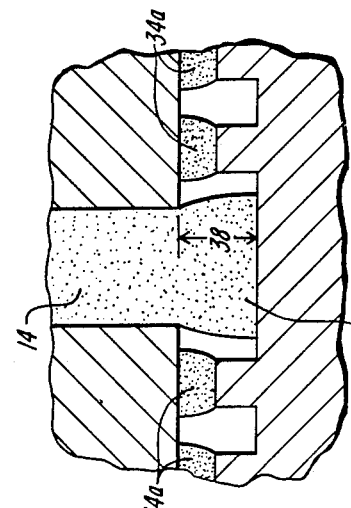
FIG. 2 is a schematic cross-sectional view of the ferrofluid reservoir section outlined by dotted lines A in FIG. 1.

The structure of cavity 37 is best seen in FIG. 2 which is an expanded view of the cavity area. Ferrofluid located within cavity 37 constitutes extra ferrofluid not necessary for the sealing function of the other multiple stages of the seal. Due to the fact that the width of cavity 37 is larger that the seal stage gap widths, the magnetic flux strength within the cavity is also smaller than the flux strength in the seal gaps. Accordingly, as the ferrofluid within the seal gaps in stages 50 degrades and/or is lost, the entire pressure drop across the seal appears across cavity 37 and seal stages 52. Since the flux strength in cavity 37 is small and since the number of seal stages in series 52 is small, these stages immediately break down and allow air to pass toward vacuum side 21. However, as air starts to leak toward vacuum side 21, ferrofluid within the cavity 37 is swept by the air flow toward the seal gaps. As the fluid moves into the seal gaps, it is trapped by the high magnetic flux in the gaps and replenishes them without disassembly or replacement of the seal.

Bearing assemblies that support shaft 3 can be conveniently located in either of two places. The first location, shown in FIG. 1, contemplates that the magnetic circuit which generates the magnetic flux in the sealing gaps will be completed through housing 1 and cover 2 as shown by dotted lines 24 and through housing 1 and end wall 18 as depicted by dotted lines 15. In this arrangement, bearings 6 are positioned in annular recesses in pole piece 5. The recesses are lined with non-magnetically permeable inserts 9. One bearing is retained by the spacer 10 and the other bearing is retained by snap rings 11 which fit into grooves machined into shaft 3. Only leakage magnetic flux passes through bearings 6 while the primary magnetic circuit 15 is formed through the housing and cover to the shaft.

Figure 3:
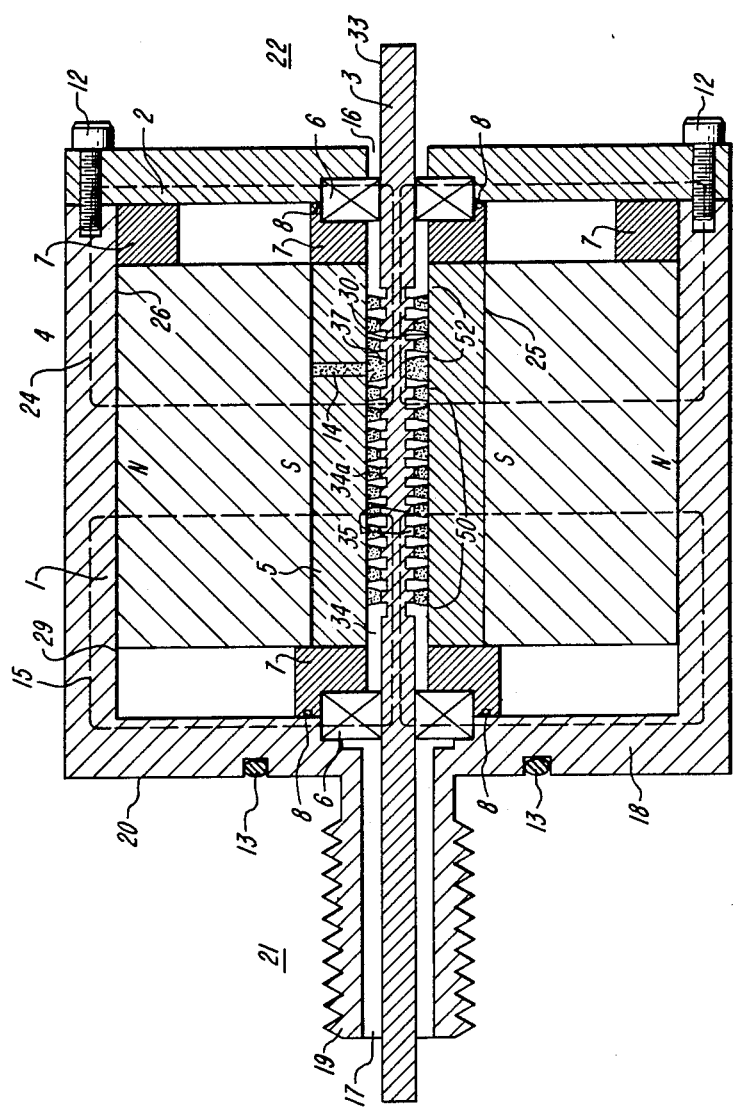
FIG. 3 is a schematic cross-sectional view of another multistage ferrofluidic sealing system in accordance with the present invention.

The second bearing location, shown in FIG. 3, contemplates that the magnetic circuit will be completed directly through the bearing structure. In this second arrangement, bearings 6 are mounted in recesses in the housing end wall 18 and in cover 2 and are retained in place by non-magnetically permeable spacers 7. Spacers 7 are, in turn, sealed to wall 18 and cover 2 by means of elastomeric O-rings 8. In this case, the primary magnetic flux paths 15 and 24 extends directly through bearings 6.

The structure of FIG. 3 is particularly advantageous because it allows the use of an additional ferrofluid seal around the bearing in order to protect the bearing lubricants from contaminants and to offer additional protection against contamination of the main sealing area between the bearings.

Figure 4:
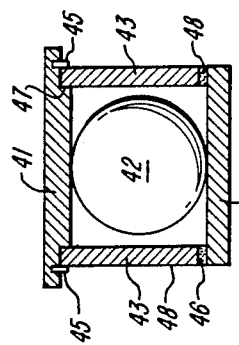
FIG. 4 is a schematic cross-sectional view of a bearing element in accordance with the present invention.

A sealed bearing structure which can be used in the FIG. 3 embodiment is best seen by reference to FIG. 4. The bearing comprises magnetically permeable, annular inner and outer races 41 and 44 encompassing ball bearings 42. Annular, magnetically permeable shields 43 are affixed to outer race 41 in any convenient manner (for example by means of a snap rings 45 designed to hold shields 43 against ledges 47 machined into the inner surface of the outer race 41). Shields 43 extend from the inner surface of race 41 radially inward toward inner race 44 to create a gap 46 between their inner ends 48 and the outer surface of the inner race 44. Ferrofluid within gaps 46 is retained in place by the magnetic flux which passes through the bearing structure when it is installed in the seal assembly of FIG. 3. Since the magnet which generates the field for the primary seal assembly also generates the field for the bearing seal, a second magnet which has conventionally been located either at or within the bearing structure can be eliminated. The ferrofluid utilized within the bearing seals can be either the same as. or different from, the ferrofluid utilized within the main seal. Ferrofluids suitable for use within the illustrative embodiment include oil-based ferrofluids with very low vapor pressures such as synthetic hydrocarbon-based or ester-based lubricating oils, flurorcarbons, polyphenyl ethers, and silicones having saturation magnetizaton values in the range from about 200 Gauss to 600 Gauss, and viscosity vales in the range of from about 50 cp to 5000 cp at 27° C. Permanent magnets spanning an energy range from approximately 1.1 mG-Oe to 25 mG-Oe including ferrite, Alnico, and rare earth materials such as Sm-Co and Nd-Fe-B are suitable for use in this invention.

The illustrative embodiment reduces the number of components which require critical tolerance to be maintained during manufacture. In the conventional seal of the type illustrated, it was conventionally necessary to maintain shaft diameter, pole piece inner and outer diameter, housing inner diameter, and bearing bore and sleeve tolerances to within critical limits in order to assure appropriate seal performance. The single, generally annular-shaped, pole piece of the illustrative embodiment which surrounds the shaft removes the necessity for the housing internal diameter and the pole piece outer diameter to be precisely machined. This advantage is achieved because the magnet takes up the space between these two diameters in the assembled seal and critical tolerances are not required for proper magnet function. Significant cost savings are therefore possible with this embodiment because fewer components are needed, and because the tolerances of some dimensions, heretofore believed critical, need not be as precisely maintained as in the prior art. Furthermore, seal life is extended significantly.

Numerous alterations, modifications, advantages, features, and adjustments to the present invention will occur to those skilled in the ar in view of the foregoing detailed description of two illustrative embodiments thereof. For example, the reservoir of the present invention may be applied to a two stage seal as well as to multistage seals having many seal stages. The present invention is not intended to be limited to the illustrative embodiments described, but is intended to be limited only by the claims which follow.

We claim:

1. A long-life ferrofluid seal designed to withstand a pressure drop between a first low pressure area and a second high pressure area, said ferrofluid seal comprising:
   a first ferrofluid seal comprising at least one seal stage, said first ferrofluid seal having sufficient pressure capacity to withstand said pressure drop, said first ferrofluid seal being located adjacent said first low pressure area;
   a second ferrofluid seal having a pressure capacity substantially below said pressure drop, said second ferrofluid seal being located adjacent said second high pressure area;
   a ferrofluid reservoir located between said first ferrofluid seal and said second ferrofluid seal, said ferrofluid reservoir being filled with ferrofluid; and
   means for generating a magnetic flux through said ferrofluid in said reservoir, said magnetic flux having sufficient strength to hold said reservoir ferrofluid in said reservoir, but said magnetic flux having a low enough value to allow migration of said ferrofluid in said reservoir to replenish the ferrofluid in said first ferrofluid seal if said first ferrofluid seal fails.

2. A long-life ferrofluid seal according to claim 1 wherein said seal stage in said first ferrofluid seal comprises means for defining an annular seal gap, means for generating a magnetic flux through said seal gap and ferrofluid in said seal gap, said ferrofluid in said seal gap being held in said seal gap by said magnetic flux in said seal gap and wherein said magnetic flux in said seal gap has a higher strength than said magnetic flux in said reservoir.

3. A long-life ferrofluid seal according to claim 2 wherein said means for generating a magnetic flux through said reservoir and said means for generating a magnetic flux in said seal gap comprise a single permanent magnet.

4. A long-life ferrofluid seal according to claim 1 wherein said first ferrofluid seal comprises a plurality of seal stages.

5. A long-life ferrofluid seal according to claim 1 wherein said first ferrofluid seal and said second ferrofluid seal are each formed by means of seal gaps between a single pole piece and a rotating shaft and wherein said reservoir comprises a cavity in said pole piece located between said first ferrofluid seal and said second ferrofluid seal.

6. A long-life ferrofluid seal according to claim 1 wherein said reservoir has sufficient ferrofluid capacity to replenish the ferrofluid in said first ferrofluid seal if said first ferrofluid seal fails a plurality of times.

7. A multistage ferrofluid seal designed to withstand a pressure drop between a high pressure area and a low pressure area, said seal comprising:
   a magnetically-permeable, hollow housing;
   a magnetically-permeable shaft extending through said housing from said high pressure area to said low pressure area;
   an annular, radially-polarized magnet mounted inside said housing so that said magnet is in contact with said housing, said shaft passing through said magnet;
   an annular, magnetically-permeable pole piece mounted inside said magnet and between said magnet and said shaft, said pole piece extending close to, but not touching, said shaft, at least one of said pole piece and said shaft having means for defining a plurality of seal gaps between said pole piece and said shaft, said seal gaps being spaced axially along said shaft;
   ferrofluid in each of said seal gaps, said ferrofluid within said seal gaps being retained therein by the magnetic flux generated by said magnet to form a plurality of seal stages;
   a ferrofluid reservoir created by a cavity in said pole piece, said reservoir being located among said seal stages and positioned so that the overall pressure capacity of seal stages located between said reservoir and said low pressure area is at least equal to said pressure drop and the overall pressure capacity of seal stages located between said reservoir and said high pressure area is less than said pressure drop;
   whereby upon degradation or loss of the ferrofluid within said seal stages located between said reservoir and said low pressure area, ferrofluid within said reservoir is swept into said seal stages located between said reservoir and said low pressure area by fluid leaking toward said low pressure area from said high pressure area.

8. A multi-stage ferrofluid seal according to claim 7 wherein there are at least two seal stages located between said low pressure area and said reservoir.

9. A multi-stage ferrofluid seal according to claim 7 further comprising at least two bearings supporting said shaft, said bearings being positioned in recesses in said pole piece.

10. A multi-stage ferrofluid seal according to claim 7 further comprising at least two bearings supporting said shaft, and wherein said housing has a first and a second end wall through which said shaft passes and said bearings are positioned in recesses in said first end wall and said second end wall.

11. A multi-stage ferrofluid seal according to claim 10 wherein each of said bearings is provided with shields disposed axially along said shaft on either side of said each bearing, said shields forming ferrofluid seals on either side of said each bearing.

12. A multi-stage ferrofluid seal according to claim 11 wherein magnetic flux generated by said magnet passes through said first end wall and said shields to form said ferrofluid seals on either side of said each bearing.

13. A multistage ferrofluid seal adapted for use between a zone of higher pressure and a zone of lower pressure comprising:
   a magnetically-permeable, hollow housing defining a cavity having substantially continuous outer wall, a first end wall adjacent said zone of higher pressure, and a second end wall adjacent said zone of lower pressure, said first and second end walls defining openings therethrough substantially centrally thereof;
   a magnetically-permeable shaft defining a shaft surface extending through said openings and said cavity from the high pressure side of said housing to the low pressure side thereof;
   an annular, radially-polarized magnet having inner and outer concentric surfaces disposed within said cavity such that the outer concentric surface of said magnet is in contact with the outer wall thereof;
   an annular, magnetically-permeable pole piece having inner and outer concentric surfaces disposed within said cavity such that the outer concentric surface of said pole piece is in contact with the inner concentric surface of said magnet and the inner concentric surface of said pole piece is close to, but not touching, the surface of said shaft so as to define a first gap therebetween;

at least one of the surfaces defining said first gap having a first and a second series of substantially equally spaced annular projections extending radially therefrom into said first gap so as to define a first and a second series of smaller gaps within said first gap. said first and second series of projections being separated by a preselected distance in excess of the spacing between adjacent projections in either the first or the second series thereof;

a ferrofluid disposed within each of the smaller gaps of the first and the second series thereof; and within the portion of the first gap located between the first and the second series of projections, said ferrofluid within the smaller gaps being retained therein by the magnetic flux located within each of said smaller gaps, and the ferrofluid within the portion of the first gap located between the first and the second series of projections being retained therein by the ferrofluid within the adjacent smaller gaps, and by the magnetic flux present within said portion;

said first series of smaller gaps being located substantially adjacent the second the end wall of said housing, with the number of smaller gaps in said first series thereof being so selected that the sum of the pressure capacities of the ferrofluidic O-rings disposed therein is at least equal to the total pressure capacity desired for said multistage ferrofluidic seal; and at least one of the surfaces defining said first gap having a first and a second series of substantially equally spaced annular projections extending radially therefrom into said first gap so as to define a first and a second series of smaller gaps within said first gap, said first and second series of projections being separated by a preselected distance in excess of the spacing between adjacent projections in either the first or the second series thereof;

ferrofluid disposed within each of the smaller gaps of the first and second series thereof, and within the portion of the first gap located between the first and the second series of projections, said ferrofluid within the smaller gaps being retained therein by the magnetic flux located within each of said smaller gaps, and the ferrofluid within the portion of the first gap located between the first and the second series of projections being retained therein by the ferrofluid within the adjacent smaller gaps, and by the magnetic flux present within said portion;

said first series of smaller gaps being located substantially adjacent the second end wall of said housing, with the number of smaller gaps in said first series thereof being so selected that the sum of the pressure capacities of the ferrofluidic O-rings disposed therein is at least equal to the total pressure capacity desired for said multistage ferrofluidic seal; and said second series of smaller gaps being located substantially adjacent the first end wall of said housing with the number of smaller gaps in said second series thereof being so selected as to prevent the ferrofluid within the portion of said first gap between the first and second series of projections from leaking therethrough;

whereby upon degradation or loss of the ferrofluid within the smaller gaps of the first series thereof to the point at which the first series of small gaps starts to leak, some of the ferrofluid disposed within the portion of the first gap between the first and second series of projections, will be swept into the smaller gaps of the first series thereof by the air leaking toward the lower pressure side of the seal to be retained in those smaller gaps by the magnetic flux therein, rejuvenating the seal and restoring its pressure capacity.

14. The multistage ferrofluid seal of claim 13 further characterized in that the bearings for the shaft are disposed outside the primary magnetic circuit within substantially annular recesses in the inner concentric surface of the pole piece at opposite ends of said first gap and are separated from said pole piece by non-magnetically permeable insert elements such that only stray magnetic flux passes through said bearings.

15. The multistage ferrofluid seal of claim 13 further characterized in that the bearings for the shaft are disposed within the primary magnetic circuit of the seal.

16. The multistage ferrofluidic seal of claim 15 further characterized in that the bearings for the shaft are mounted within annular recesses formed in the end walls of the housing adjacent the openings therein, and comprise an inner magnetically permeable annular race and an outer magnetically permeable annular race disposed concentrically about magnetically permeable ball bearings; a pair of magnetically permeable annular bearing shields having first and second ends affixed at their first ends to, and extending radially inwardly from, the outer race, one on each side of said ball bearings, to locate their second ends close to, but not touching, the inner race thereby forming second and third gaps between the second ends of said shields and said inner race; and a ferrofluid disposed within the second and third gaps, said ferrofluid being retained in place by the magnetic flux contained within said gaps which flux has its source in the magnet of the multistage ferrofluidic seal structure.

17. The multistage ferrofluid seal of claim 13 further characterized in that said pole piece defines a radially-extending, sealable hole between the inner and outer concentric surfaces of said pole piece, said hole opening into the portion of the first gap between the first and second series of projections, whereby said portion of said first gap may be filled with ferrofluid conveniently subsequent to the disposition of ferrofluid with the smaller gaps of said first and second series thereof.

18. The multistage ferrofluid seal of claim 13 further characterized in that the magnet is selected such that its energy product is form about 1.1 to 25 MG-oe.

19. The multistage ferrofluid seal of claim 13 further characterized in that the ferrofluid is selected such that its magnetization saturation is from about 200 Gauss to 600 Gauss, and such that its viscosity is between about 50 cp and 5000 cp at 27° C.

* * * * *